May 20, 1969  F. SCHLEGEL  3,445,154
MODIFIED TRIPLET LENS SYSTEM
Filed Aug. 10, 1966
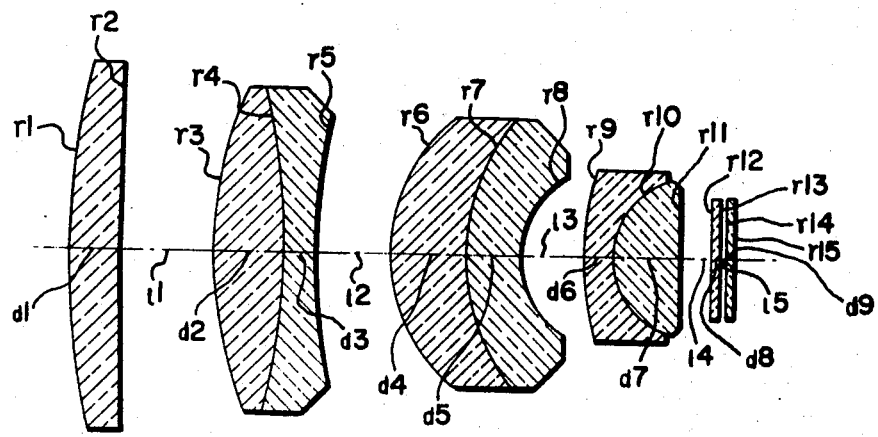
INVENTOR.
FRANZ SCHLEGEL
BY Low & Berman
AGENTS

United States Patent Office 3,445,154
Patented May 20, 1969

3,445,154
MODIFIED TRIPLET LENS SYSTEM
Franz Schlegel, Munich, Germany, assignor to Optische
Werke G. Rodenstock, Munich, Germany
Filed Aug. 10, 1966, Ser. No. 571,539
Int. Cl. G02b 1/00, 9/34
U.S. Cl. 350—176          1 Claim

ABSTRACT OF THE DISCLOSURE

A well corrected modified triplet lens system having an aperture of approximately $f:1.1$ having an adequate back focus for use as a telescopic lens in an 8 mm. movie camera has seven glasses constituting two air-shaped convergent elements on the object side of the system the inner one being a cemented doublet, and two additional cemented doublets which are a divergent, meniscus-shaped element and a convergent element on the image side of the system. Specific design parameters are given.

---

This invention relates to photographic objectives, and particularly to a lens system of very high light-passing power.

The invention is more particularly concerned with the type of triplet derivative in which the front element of the basic triplet construction is replaced by two positive elements for the required high refractive power, that is needed for a relative aperture of more than $f/2$. It is known that at least one of these two positive elements needs to be a cemented compound lens, and the same holds for the next lens, a divergent, meniscus-shaped lens whose concave surface faces the stop, and also for the convergent lens which defines the rear focus of the lens system and which rearwardly bounds the space for the stop.

Known triplet derivatives of the type described have been known heretofore, and relative apertures as high as $f/0.75$ have been achieved by the use of glasses of great thickness which were necessary to achieve not only the desired relative aperture, but also the necessary correction of aberrations. The back focus of the known lens systems is extremely short, and sometimes zero, so that the rear focal plane coincides with the rearmost glass surface. Such lenses cannot be used for photographing distant objects.

The known lenses can be corrected for astigmatism only with great difficulty by suitable balancing the indices of refraction of the glasses which have a common cemented interface, and by carefully selecting the curvatures of the interfaces.

It has now been found that residual aberrations can be reduced by a full order of magnitude at relative apertures of about $f/1.0$, the loss of about one-half in image brightness, as compared to the afore-mentioned $f/0.75$ lenses, being more than compensated for by improved resolution of fine detail and better contrast. The back focus is increased very substantially, and makes it possible to install flat transparent filter plates or the glass walls and shields of image intensifier tubes, image converters, and the like within the lens system without unduly restricting the space for careful adjustment and focusing of very distant objects.

The lens system of the invention relies on the use of glasses having high refractive power, but the results achieved are also due to the fact that the elements of the system which are affected by positive aberration can be distributed more uniformly throughout the entire lens system than has been possible heretofore.

Practically the only structural elements of this type in the known lens systems referred to above is the concave surface of the divergent meniscus lens which faces the stop. The negative cemented interface within the two convergent compound lenses at the object end of the lens were assigned heretofore at most two percent of the absolute value of the total refractive power of the lens system.

In the lens system of the invention, the share of refractive power of this cemented interface is more than 4% because of the substantial difference in the refractive indices of the cemented glasses.

An illustrative example of the lens system of the invention is illustrated in the attached drawing in diagrammatic section on its optical axis. Its focal lengths is 1 inch, its relative aperture $f/1.1$.

Radii of curvature $r$, thicknesses $t$, and separations $s$ of the illustrated lens system are listed in the table below in multiples of the equivalent focal length, together with indices of refraction $n_E$ and Abbe numbers $E_E$. At least some of the advantages of the invention are obtained in a lens system which does not differ substantially from the listed values.

TABLE

| Glass | Radii | Thicknesses Separations | Refractive Index, $n_E$ | Abbe number, $V_E$ |
|---|---|---|---|---|
| I | $r_1 = +2.08$ | $t_1 = 0.142$ | 1.721 | 47.7 |
|   | $r_2 = +23.6$ | $s_1 = 0.21$ | | |
| II | $r_3 = +0.987$ | $t_2 = 0.182$ | 1.721 | 47.7 |
| III | $r_4 = -2.035$ | $t_3 = 0.078$ | 1.813 | 25.3 |
|   | $r_5 = +1.771$ | $s_2 = 0.178$ | | |
| IV | $r_6 = +0.435$ | $t_4 = 0.194$ | 1.694 | 54.6 |
| V | $r_7 = +0.541$ | $t_5 = 0.142$ | 1.768 | 26.8 |
|   | $r_8 = +0.226$ | $s_3 = 0.150$ | | |
|   | $r_9 = +0.621$ | | | |
| VI | $r_{10} = +0.2035$ | $t_6 = 0.082$ | 1.592 | 52.9 |
| VII | $r_{11} = +11.32$ | $t_7 = 0.170$ | 1.792 | 50.2 |
|   |   | $s_4 = 0.0753$ | | |
| VIII | $r_{12} = \infty$ | $t_8 = 0.028$ | | |
|   | $r_{13} = \infty$ | $s_5 = 0.00536$ | | |
| IX | $r_{14} = \infty$ | $t_9 = 0.015$ | | |
|   | $r_{15} = \infty$ | | | |

The back focus of the illustrated lens system is zero.

The glass VIII is a filter which absorbs infrared radiation and protects a photocathode tube from heat change, only the frontal glass wall IX of the tube being shown.

It will be understood that the lens system may be employed for purposes other than that specifically illustrated. The glasses I to VII constitute a telescopic lens for an 8 mm. movie camera.

What is claimed is:

1. A modified triplet lens system consisting of two air-spaced meniscus-shaped convergent elements on the object side of the system, a divergent meniscus-shaped element in the middle, and a convergent element on the image side of the system, said convergent element having a concave rearmost surface, the inner one of said two meniscus-shaped convergent elements, said divergent element, and said convergent element on the image side having a cemented interface between two glasses, the relative aperture of said lens system being approximately 1.1, whereby said system has seven glasses I–VII, the radii of curvature $r$, thicknesses $t$, separations $s$, refractive indices $n_E$, and Abbe number $V_E$ of said glasses being substantially as listed in the following table, said radii, thicknesses, and separations being expressed as multiples of the equivalent focal length of said lens system

TABLE

| Glass | Radii | Thicknesses Separations | Refractive Index, $n_E$ | Abbe number, $V_E$ |
|---|---|---|---|---|
| I | $r_1=+2.08$ | $t_1=0.142$ | 1.721 | 47.7 |
|   | $r_2=+23.6$ | $s_1=0.21$ | | |
| II | $r_3=+0.987$ | $t_2=0.182$ | 1.721 | 47.7 |
|    | $r_4=-2.035$ | | | |
| III | $r_5=+1.771$ | $t_3=0.078$ | 1.813 | 25.3 |
|     |              | $s_2=0.178$ | | |
|     | $r_6=+0.435$ | | | |
| IV | $r_7=+0.541$ | $t_4=0.194$ | 1.694 | 54.6 |
| V  | $r_8=+0.226$ | $t_5=0.142$ | 1.768 | 26.8 |
|    |              | $s_3=0.150$ | | |
|    | $r_9=+0.621$ | | | |
| VI | $r_{10}=+0.2035$ | $t_6=0.082$ | 1.592 | 52.9 |
| VII | $r_{11}=+11.32$ | $t_7=0.170$ | 1.792 | 50.2 |

References Cited

UNITED STATES PATENTS 3,300,267  1/1967  Pennig _____ 250—223

JOHN K. CORBIN, Primary Examiner.

U.S. Cl. X.R.

350—223